United States Patent [19]

Hon

[11] 4,360,345

[45] Nov. 23, 1982

[54] HEALTH EDUCATION SYSTEM

[75] Inventor: David Hon, Dallas, Tex.

[73] Assignee: American Heart Association, Inc., Dallas, Tex.

[21] Appl. No.: 167,963

[22] Filed: Jul. 14, 1980

[51] Int. Cl.³ .......................... G09B 23/28; G09B 5/06
[52] U.S. Cl. .................................. 434/262; 434/307; 434/323; 434/428
[58] Field of Search ........ 434/307, 262, 263, 265–267, 434/308, 309, 314–316, 322, 323, 324, 325, 335, 362, 365, 366, 428; 364/200, 900, 413–419; 84/484; 340/329, 366 R

[56] References Cited

U.S. PATENT DOCUMENTS

| | | |
|---|---|---|
| 3,049,811 | 8/1962 | Ruben . |
| 3,199,225 | 8/1965 | Robertson et al. . |
| 3,209,469 | 10/1965 | James . |
| 3,276,147 | 10/1966 | Padellford . |
| 3,520,071 | 7/1970 | Abrahamson ...................... 434/265 |
| 3,562,924 | 2/1971 | Baerman et al. . |
| 3,562,925 | 2/1971 | Baerman et al. . |
| 3,568,333 | 3/1971 | Clark . |
| 3,736,362 | 5/1973 | Laerdal . |
| 3,832,790 | 9/1974 | Fryer et al. ...................... 434/324 |
| 3,872,609 | 3/1975 | Smrcka . |
| 3,947,974 | 4/1976 | Gordon et al. . |
| 3,994,075 | 11/1976 | Kohnke . |
| 3,996,671 | 12/1976 | Foster ................................. 434/321 |
| 4,001,950 | 1/1977 | Blumensaadt . |
| 4,020,468 | 4/1977 | Silver et al. ........................ 434/307 |
| 4,060,915 | 12/1977 | Conway ............................. 434/307 |
| 4,087,933 | 5/1978 | Strongin . |
| 4,091,550 | 5/1978 | Schrenk et al. .................... 434/366 |
| 4,092,788 | 6/1978 | Gowing . |
| 4,094,079 | 6/1978 | Dorsett ............................... 434/307 |
| 4,095,590 | 6/1978 | Harrigan . |
| 4,194,303 | 3/1980 | Heller . |

OTHER PUBLICATIONS

Leavitt, H., and Slosberg, R.; "Computer Simulated Patients for Enhancing Clinical Experiences"; *Educational Technology*; Jun. 1978; pp. 42–44.

Patrick, H. and Eisenberg, L.; "An Electronic Resuscitation Evaluation System"; *IEEE Transactions and Biomedical Engineering*; Jul. 1972; pp. 317–320.

*Primary Examiner*—Vance Y. Hum
*Attorney, Agent, or Firm*—Sigalos & Levine

[57] ABSTRACT

A computer controlled interactive instruction system for teaching an individual comprising a peripheral having at least one sensor for producing a signal representing a function which has been or is to be manually performed by the individual, a first device for storing a sequence of signals representing instructions relating to the correct manner of performing the function, a first display coupled to the storing device for displaying the instructions, a second device for storing video and associated audio signals representing both pictorial and oral representations of the correct manner of performing the function, a second display for displaying the pictorial representation, and a computer coupled to the peripheral, the first and second storage devices and the first and second displays for causing an ordered sequence of the instruction signals in the first signal storage device to be displayed by the first display whereby the individual may learn to recognize and to perform the function, for receiving the signals from the peripheral and detecting correct or incorrect performance of the function by the individual and for causing appropriate ones of the stored video signals to be displayed by the second display and the associated audio signals to be produced to illustrate the correct performance of the function if incorrectly performed by the individual whereby telling, showing and coaching of the individual in the recognition and performance of the function may be accomplished.

47 Claims, 17 Drawing Figures

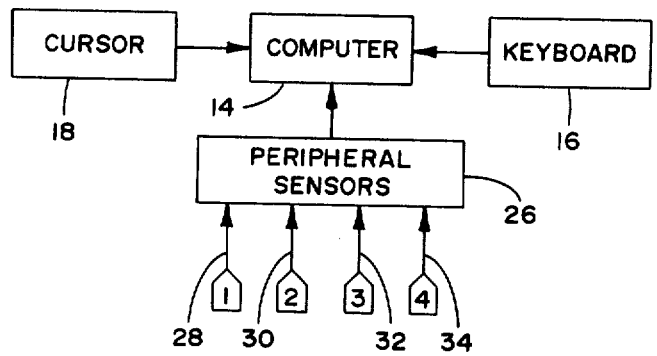
FIG 3 (INPUTS)
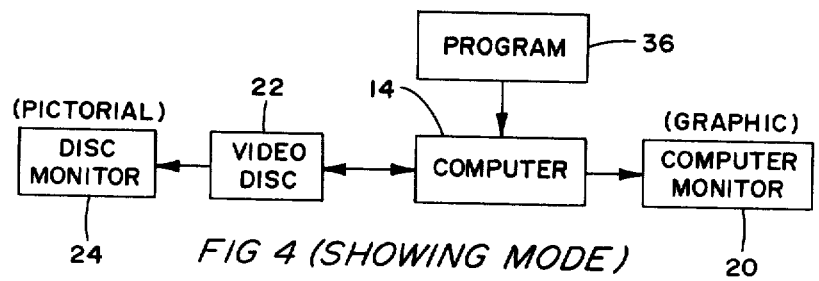
FIG 4 (SHOWING MODE)
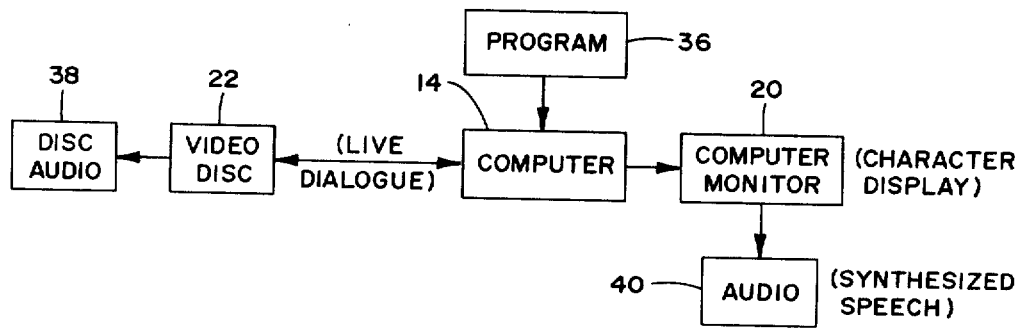
FIG 5 (TELLING MODE)
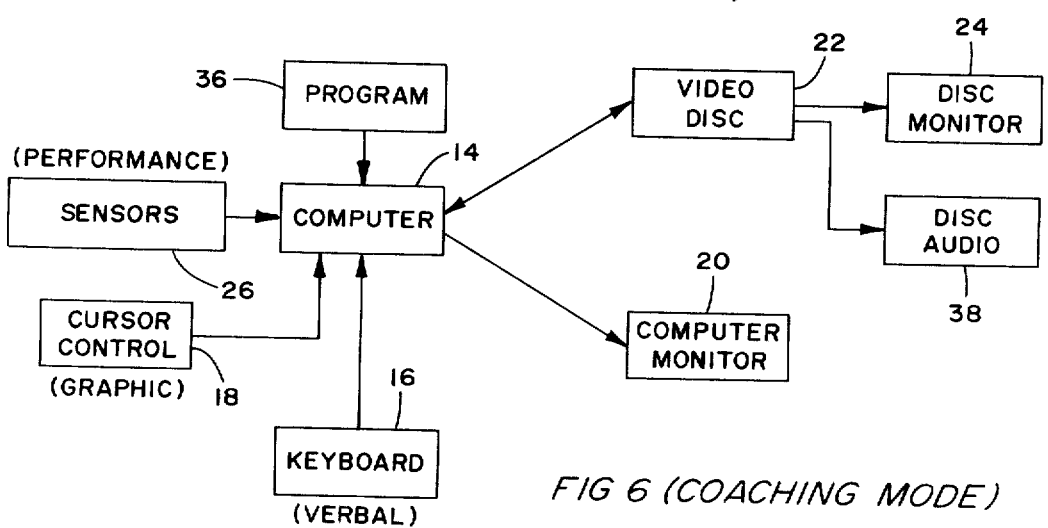
FIG 6 (COACHING MODE)

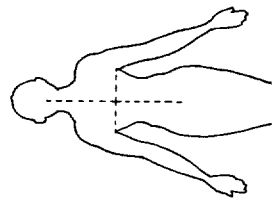
FIG 7

(SHEET 1)

(SHEET 2)

HEALTH EDUCATION SYSTEM

BACKGROUND OF THE INVENTION

The present apparatus and method relate to a computer/video/peripheral interactive educational system which, by means of a program and a peripheral connected to a computer, not only shows and tells the student by conventional presentation methods and not only tests and directs the student as in an interactive computer method but by means of computer graphics, pictorial video discs and simulation peripherals, it coaches the student toward precise performance of complicated psychomotor and conceptual skills, and precisely evaluates that performance. By utilizing both a computer monitor and a video monitor, it enables abstractions to be related to reality in the learning process.

For several years, educators have been attempting to design and refine electronic means of teaching so that education and training might match the demands of exploding technology and yet train more people in less time, with less cost, and with less involvement in basic level subjects by top professionals who are needed elsewhere. The results of their efforts can be seen in systems involving TV instruction, print-programmed instruction, and computer aided instruction. All of these systems are valuable but technical limitations make each system a helpful tool only. In most cases, the systems became tools to aid live instruction. As a total system, the television media could not be flexible to accommodate learner differences. It could only "present" and, at best, stop at predetermined times so that the student could interact with a workbook. Further, the computer was limited to the presentation of written information and has now advanced to include graphics with which the student can sometimes interact by means of a light pen or touch screen device. The computer cannot, however, ask for "hands-on" demonstrations and, in response, coach with real life examples. Further, print-programmed instruction demands a heavy concentration by the learner and, although it can "interact" with the learner, does not do so with the control and immediacy of a computer.

"Live" instruction is, of course, a valuable tool in educational programs. However, a "live" instruction to 400 people does not occasion much interaction. An interactive computer, demanding of the individual student, may be preferable to the "spray" of information at some lectures. Also, numerous studies by the government and by educational institutions have shown that no media, including live instruction, is necessarily better than another. Rather, the quality of the instruction, both in design and presentation, determines both learning and retention by the student. While a great many films and video tapes have been made at great cost to effect learning programs, they have been made simply to transfer information and, for the most part, do not ensure effective learning. Therefore, they have been able to achieve little more than to make live presentations livelier and more effective and, in a few cases, to transmit necessary information in a self contained presentation. Such presentations are useful but cannot guarantee learning in the way an interactive system can. Such interactive computer instruction does not consist simply of multiple choice quizzes. The more complicated the branching of the computerized instruction program, the more individualized learning may become.

Computer aided instruction seemed to promise a high rate of participation wherein one system could handle up to several thousand trainees per year, and to allow ultra-low involvement by trainers and top technological personnel who now must devote much valuable time in training. However, no known electrodigital system utilizes the concept of a "hands-on" peripheral correlated with video graphics, video simulation, audio and computerized verbal communication which give the system ability to tell, show, test, and coach the learner in tutorial fashion.

Such system could obviously be used in any technical field to teach a predetermined skill or concept or series of skills and concepts. However, the preferred embodiment in this application relates to a computer-video learning system for cardiopulmonary resuscitation (CPR) and a description of the invention hereinafter will relate to the CPR system.

Each year hundreds of thousands of people die who might have lived if people around them, average, ordinary people, knew how to recognize certain danger signals and give immediate life-saving assistance.

It is estimated that over 650,000 individuals die from heart attacks each year. Of these, nearly two-thirds die, usually outside a hospital, within the first two hours of the attack. Many of these deaths are senseless. They can be accounted for by failure to recognize the symptoms, or worse, failure to accept the truth of the symptoms.

Although some persons suffer agonizing pain when they have a heart attack, many do not. They feel tightness and a cramping in the chest as if they were suffering from heartburn or indigestion. For this reason many people write-off the symptoms as exactly that. Many even deny the presence of pain. They refuse to believe they could possibly be having a heart attack. They don't want to worry their family needlessly or call the doctor at 2:00 a.m. As a result, many die needlessly.

The ability to recognize early warning signs is extremely important in the prevention of death from heart attack. The signs include heartburn, indigestion, persistant chest, shoulder, and arm pain, sweating, nausea, vomiting, palpitations or fluttering heart sensations, fatigue, or weakness.

Another common medical emergency occurs when the person has a stroke. The victim of a stroke may only need assistance to maintain open breathing passages so his breathing will not stop. Without rapid diagnosis and treatment of an air way obstruction, the victim may die before professional help can reach him.

Accidents also take many lives, They involve drownings, auto accidents, drug intoxication, suffocation, electrocution, and others. Each of these may lead to obstructed breathing, cessation of breathing or heart arrest. Many of these people can be saved if it is known how to recognize their plight and if the reaction is immediate and effective.

Basic life support is an emergency first aid procedure that consists of (1) recognition of obstructed air way, arrested breathing and cardiac arrest, and (2) proper application of cardiopulmonary resuscitation or CPR for short.

Basic life support is a process which can be learned by any person of normal abilities. This very fact extends the potential of medical facilities astronomically, by having skilled hands out in the community sustaining life, in fact restoring life, in those valuable few minutes during which legal death has occurred, but no brain damage or body decomposition has yet begun. Typically then, there are about four key minutes in which the average person can act, or stand by helplessly.

Although a basically simple procedure, CPR applied to a healthy person may send the heart into fibrillation, killing someone who might have been healthy. For this reason, rather strict standards of training and certification are insisted upon by the American Heart Association.

However, the training and accreditation of individuals to recognize and give emergency treatment for the symptoms set forth above is a time consuming process. Initial basic life support (BLS) courses create high demands and time from staff instructors. Re-accreditation courses take more of that time. Some 7,000 hospitals in the United States are faced with this problem. Many more businesses, schools, and government institutions would teach more BLS if live instruction were not so time consuming. At least 20,000 facilities of over 500 people fall in this category (10 million people). Its effective use would mean that because more lay people throughout the society were trained, each heart victim would have much better odds of having a CPR trained rescuer nearby. With approximately 12 million people trained over the last ten years, the heart attack victim's odds may be 20:1 on persons nearby being trained in CPR. This training system could result in the odds next year being cut to 10:1, or even 5:1, due to the mass training possible when freed from the live mode. Further, as instruction is pyramided, the quality of instruction becomes less standardized.

Thus it is an object of the present invention to provide a basic life support instruction system which has a low initial cost and a high rate of participation.

It is a further object of the present invention to provide a basic life support educational system which has an ultra-low involvement by trainers and health personnel who now must devote much valuable time in training masses of people in fairly rudimentary concepts.

It is also an object of the present invention to provide a basic life support educational system which provides hands-on learning and precise feedback, adapts to the learner's pace of learning by interacting with the learner, gives rapid testing and accreditation to learners, and maintains quality through adherence to accredited methods and evaluation.

SUMMARY OF THE INVENTION

Thus, the present invention relates to a computer controlled interactive educational system for teaching an individual comprising a peripheral having at least one sensor thereon for producing a signal representing a function which has been or is to be manually performed, a first means for storing a sequence of signals representing instructions relating to the correct manner of performing said function, a first display coupled to said storing means for displaying said instructions, a second means for storing video and audio signals representing both pictorial and oral representations of the correct manner of performing said function, a second display for displaying said pictorial representations, and a computer coupled to said peripheral, said first and second storage means, and said first and second displays for causing an ordered sequence of said instruction signals in said first signal storage means to be displayed by said first display whereby said individual may learn to recognize and perform said function, for receiving said signals from said peripheral and detecting correct or incorrect performance of said function by said individual and for causing appropriate ones of said stored video signals to be displayed by said second display and said audio signals to be produced to illustrate the correct performance of said function if incorrectly performed by said individual whereby telling, showing and coaching of said individual in the recognition and performance of said function may be accomplished. The displays may consist of separate screens or mixed or split displays on one single screen. Henceforth when the word "screen" is used, it will refer to the transmitted patterns of images or characters whether on two screens or mixed or split on one single screen.

The present invention also relates to a method of computerized instruction and testing of an individual in performing a predetermined function comprising the steps of storing a sequence of signals representing instructions relating to the correct performance of said function, storing video and associated audio signals relating to the correct performance of said function, displaying on first and second displays said instructions and video signals in conjunction with said audio signals under the control of a computer, manually performing said function on a peripheral according to said instuctions, detecting any incorrect performance of said function and displaying appropriate ones of said instructions and video signals in conjunction with said audio signals under the control of said computer to illustrate the correct manner of performing said function that was incorrectly performed whereby the need for an actual instructor and live-instruction is eliminated.

BRIEF DESCRIPTION OF THE DRAWINGS

These and other objects of the present invention may be understood by referring to the following specification and drawings in which like numerals indicate like components and in which:

FIG. 3 is a schematic representation of the inputs to the computer of the present system;

FIG. 4 is a schematic representation of the computer of the present invention and its associated equipment for producing pictorial and graphic representations to the user thereof;

FIG. 5 is a schematic representation of the computer of the present invention and the associated equipment which is required to produce a live dialogue with the user thereof including audio, synthesized speech and character display;

FIG. 6 is a schematic representaton of the computer of the present invention and its associated equipment for coaching the student in the performance of a CPR function through sensing the performance of the student, providing visual representations of the correct manner of performing the function, and accepting interchange with the student through the keyboard and cursor control;

FIG. 7 and FIG. 8 are illustrations of the coaching of the student with the interactive program by illustrating on one screen what should occur, and printing on the second screen the manner in which to perform the function. The third column illustrates the application of the instruction by the student. These display images could be mixed or split on one screen instead of two separate displays.

DETAILED DESCRIPTION OF THE DRAWINGS

Figure 1:
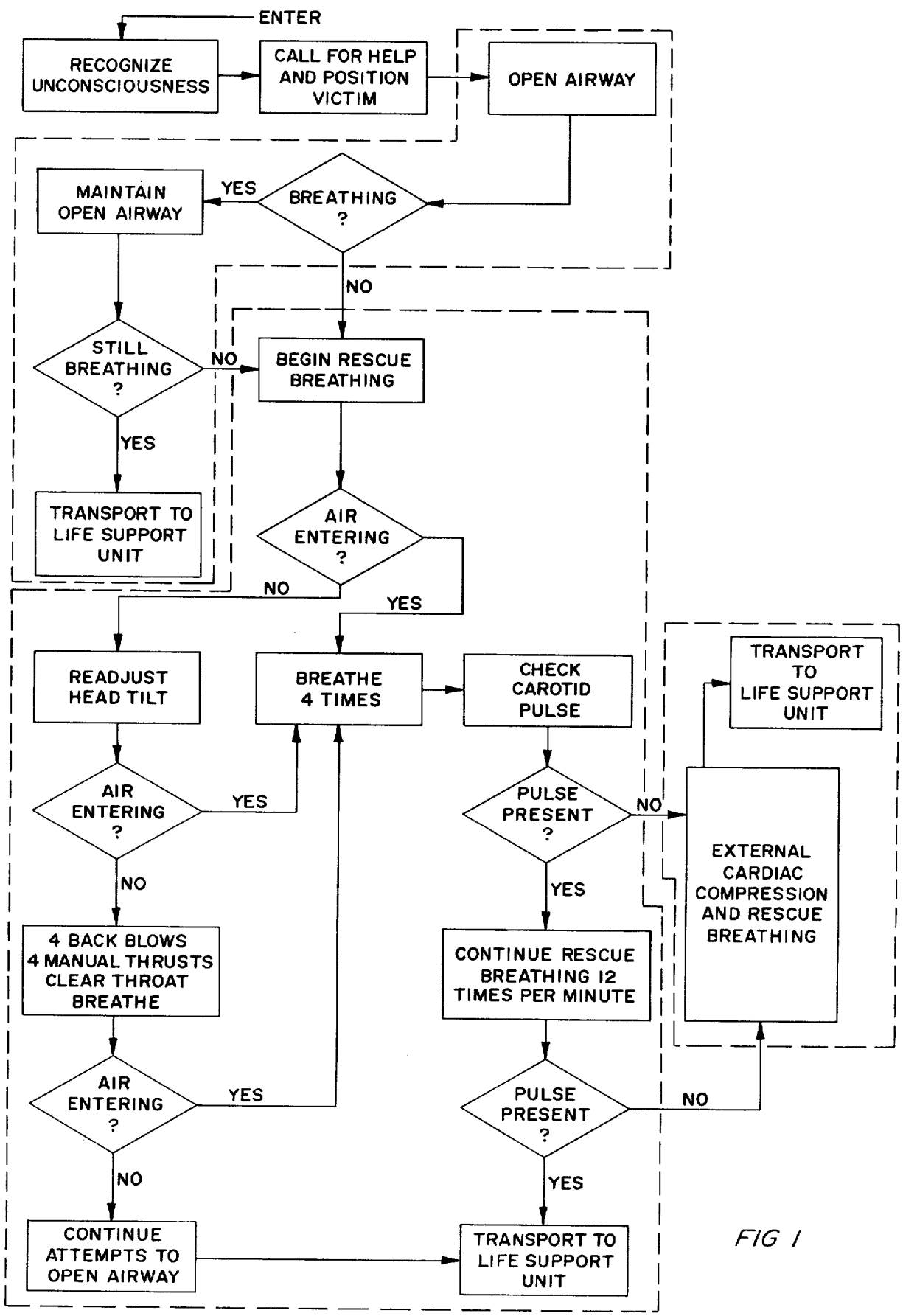
FIG. 1 is a schematic diagram of the CPR decision tree showing the various decisions that must be made and steps taken to provide basic life support for an unconscious victim.

In learning the basic life support system for an unconscious victim, certain procedures must be followed and learned by the student. A CPR decision tree is illustrated in FIG. 1 and sets forth the elements and decisions that must be made during this process. Cardiopulmonary resuscitation relates to the heart, the lungs and restoration to life. As can be seen from the CPR decision tree in FIG. 1, the fundamental skills to be performed include opening the air way, providing rescue breathing, checking the carotid pulse and providing external cardiac compression.

The computer may determine the knowledge of the student concerning the skills, concepts and vocabulary needed as set forth in FIG. 1 by giving the student a pretest in the form of questions displayed on a video screen and the student "answers" through a keyboard, cursor or peripheral sensors. Any one of a plurality of concepts relating to a particular function may be selected for display and testing. After the instruction is completed, a "final" test can be given also.

Figure 2:
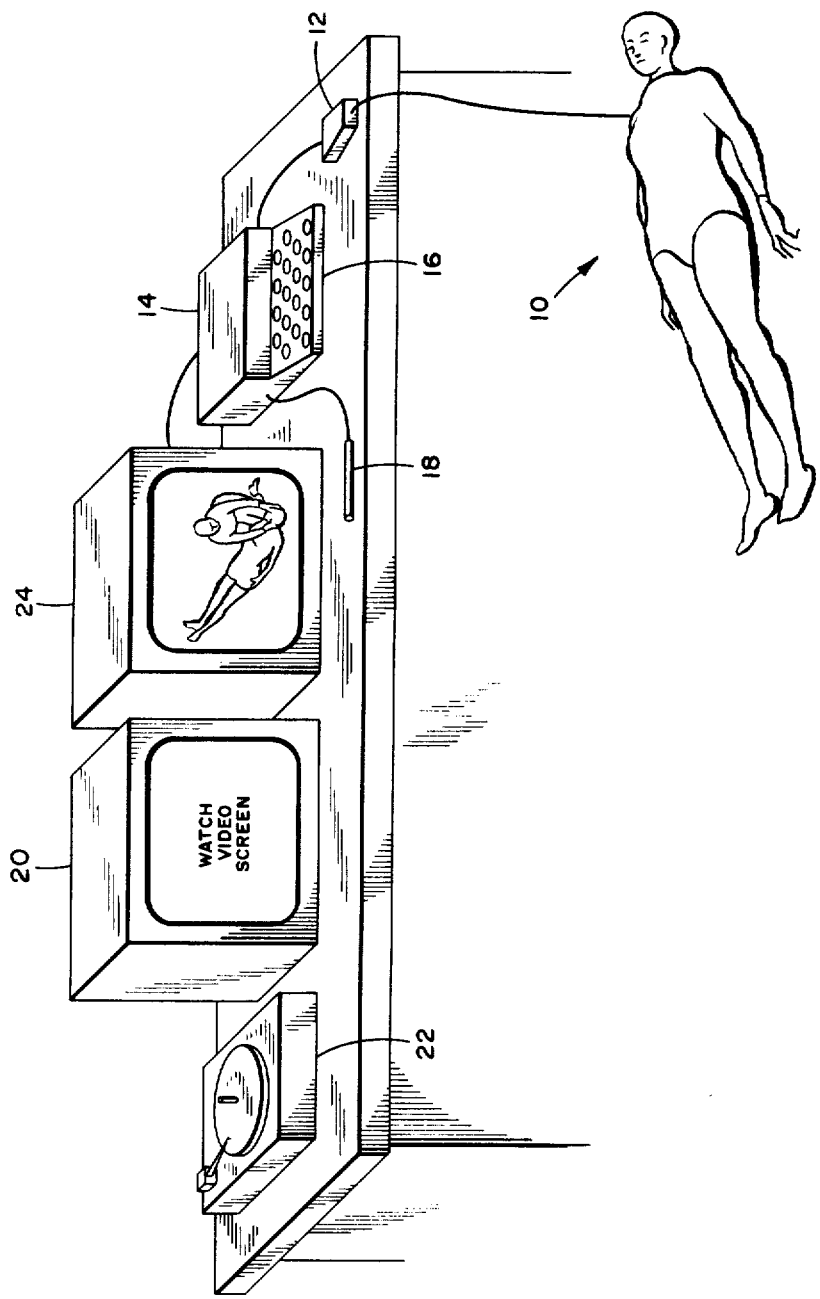
FIG. 2 is a schematic representation of a self-contained, self-instructional CPR system of the present invention including a hands-on peripheral representing the human body.

In order to provide the instruction in performing the sequence of steps shown in the CPR decision tree in FIG. 1, the present invention provides a self-contained, self-instructional CPR system as shown in FIG. 2. As can be seen in FIG. 2, a peripheral 10, which is a mannequin which represents at least a portion of the human body, is provided with sensors (not shown) which monitor the performance of the student in checking the carotid pulse, filling the lungs, positioning the hands and performing cardiac compression. With more input devices, other functions might also be monitored such as checking the blood pressure, the proper position of the head, and the like. However, for purposes of the discussion hereinafter, the functions will be limited to the four set forth above relating to the carotid pulse simulation, lung filling simulation, hand position and cardiac compression.

As shown in FIG. 2, as the student performs the hands-on procedures with the mannequin 10, the signals are coupled to interface 12 which couples the signals to microcomputer 14. Also coupled as inputs to microcomputer 14 are keyboard 16 and cursor 18 (light pen or other similar device). The cursor 18 may be used by the student as instructed by the system to point at or to designated areas on the video screens. The computer monitor 20 is a commercial type television which can print graphics or characters in accordance with instructions from the computer 14. Further, video disc 22 is coupled to computer 14 to provide random access to various video and associated audio signals stored thereon. Such video signals selected by computer 14 from video disc 22 may be displayed on monitor 24 which is also a commercial type television used herein for video demonstrations.

FIG. 3 discloses the inputs to and from computer 14 which include as stated earlier, keyboard 16 and cursor 18. Also included are peripheral sensors 26 which include hand placement sensor 28, depth of push sensor 30, lung filling sensor 32, and carotid pulse simulator 34. Depth of push sensor 30 also serves as an input for "frequency of push" which is calculated by the computer.

The novel system can show, tell and coach the learner. Thus, in the "showing mode", the computer 14 is associated with the equipment shown in FIG. 4. Under the direction of program 36, computer 14 can generate graphics, including characters, on computer monitor 20 or can randomly access video disc 22 to retrieve both pictorial and associated audio information. The pictorial information is displayed on disc monitor 24.

FIG. 5 illustrates the computer and its associated equipment in the "telling mode". Thus, computer 14, under the direction of program 36, may cause a display of characters on computer monitor 20 or produce synthesized speech through audio unit 40.

In addition, computer 14, under the direction of program 36, may have a live dialogue with the learner by selecting particular audio channels on video disc 22 and communicate information to the learner through disc audio unit 38.

FIG. 6 illustrates the system in the "coaching mode". In this mode, computer 14 has as inputs the signal from sensors 26 which are part of the peripheral mannequin 10, the cursor 18 and the keyboard 16. In response to the performance of the learner (which is determined through sensors 26, cursor 18 or keyboard 16), program 36 causes computer 14 to generate characters or graphics on computer monitor 20 and, through video disc 22, selects both video and associated audio information which is displayed on disc monitor 24 or presented audibly through disc audio unit 38. Thus the student can be coached by the system in how to perform the desired function correctly.

Figure 8:
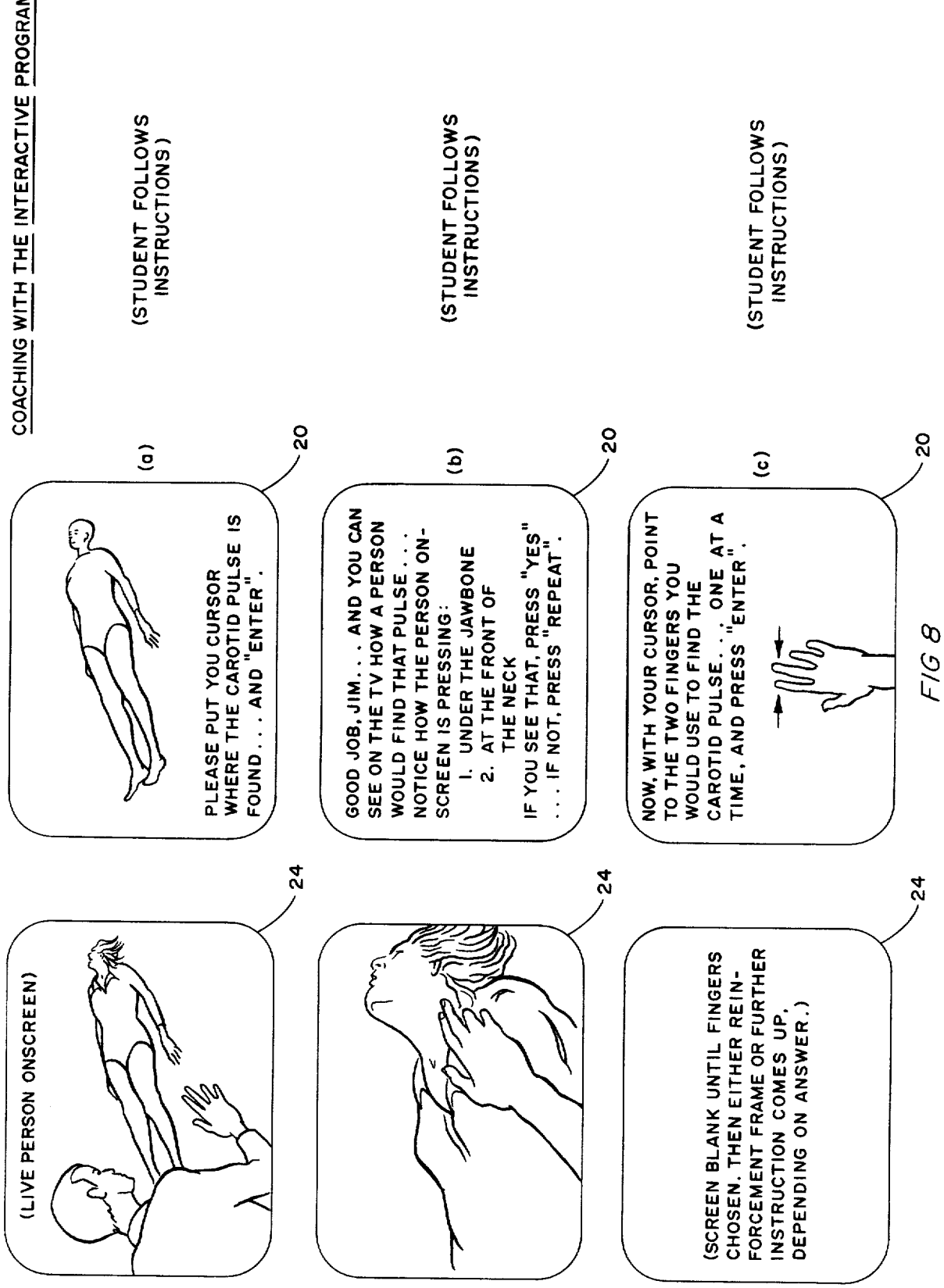

FIG. 7 and FIG. 8 illustrate the coaching mode with the interactive program and the use of the peripheral mannequin 10. Thus in FIG. 7A, the computer 14, under the direction of program 36, has selected a video channel from the information stored on video disc 22 which shows a picture on disc monitor 24 of an actual person placing the hands on the body of a second person to illustrate the correct hand placement position. At the same time, computer monitor 20 displays characters telling the student to note on the disc monitor 22 how the hands have been positioned and then displays characters telling the student to go to the mannequin and attempt to perform the desired function with the hands in the position shown. The student then works with the mannequin to attempt to perform the desired function.

In FIG. 7B, the character presentation on computer monitor 20 points out to the student that he hasn't placed his hands in the right position and asks him to watch the video disc monitor 24 wherein the program has selected a video channel illustrating a body with an imaginary line which can enable correct placement of the hands. The student simply watches. As shown in FIG. 7C, the frame shown on monitor 24 is completed while the character display on computer monitor 20 continues to instruct the student in relation to the picture shown on video monitor 24. Again, the computer monitor 20, with the character display, instructs the student to go to the mannequin and try again.

FIG. 8 illustrates the coaching mode with the interactive program wherein the student is instructed on how to check the carotid pulse. In FIG. 8A, video monitor 24 displays a live person on the screen who can actually point out the correct location for checking the carotid pulse while on computer monitor 20 the student is instructed to put the cursor in the correct location on the figure on that screen and press "Enter" on the keyboard. The student simply follows those instructions. In FIG. 8B, the video monitor 24 is showing a person actually checking the carotid pulse on a "live" person while on computer monitor 20 the character display is instructing the student on exactly what is taking place on video screen 24. Again, the character display requests the student to acknowledge certain events by pressing certain keys on the keyboard. The student simply follows the instructions. In FIG. 8C, on computer monitor screen 20 a hand is shown and the character display instructs the student to use the cursor to point to the two fingers used to find the carotid pulse and to acknowledge this step to the computer by pressing the "Enter" key on the keyboard. The video screen 24 may remain blank until the fingers are selected. Then either a reinforcement frame or further instruction comes up depending on the answer of the student.

Thus it can be seen that the system not only shows and tells the student the correct manner in which to perform a certain function but also coaches the student as the student attempts to perform the function in which he has been instructed.

Figure 9:
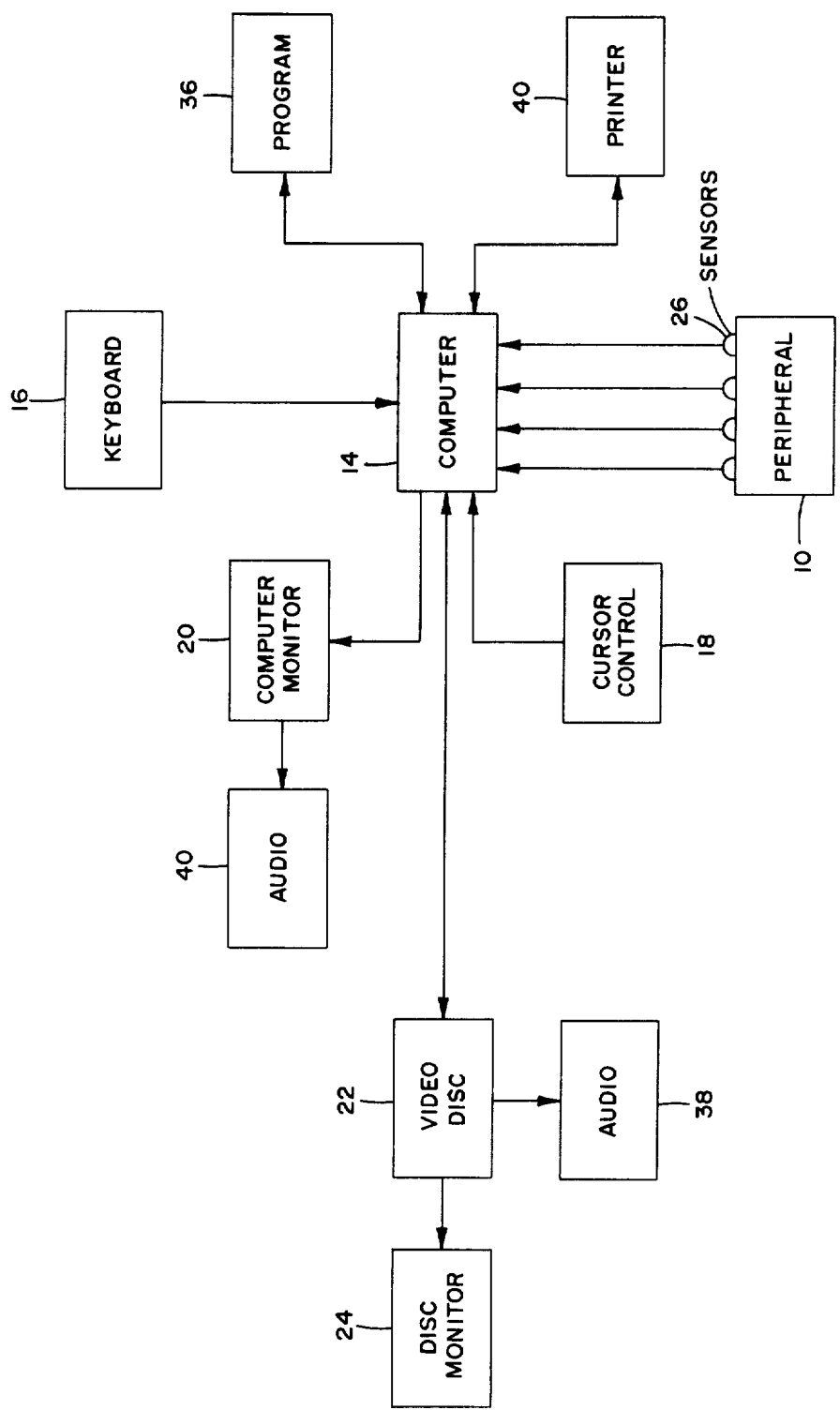
FIG. 9 is a schematic representation of the complete present invention which is a self-contained, self-instruction, CPR system.

The complete system is illustrated in FIG. 9. Computer 14 can communicate with the student by receiving input from the student through either keyboard 16, cursor 18 or sensors 26 from peripheral mannequin 10. Based on the response of the student, program 36 can then direct computer 14 to present graphics or a character display on computer monitor 20 or give audio instructions such as synthesized speech through audio unit 40. In addition, the computer may randomly access video disc 22 to select desired video and associated audio frames in response to the student input and thus display appropriate pictorial information on disc monitor 24 or give audio instructions through audio unit 38. Thus an interactive system is formed which not only shows and tells the student how to perform the function but then also coaches the student as he actively attempts to perform the function on the peripheral mannequin. Printer 20 may also be utilized, if desired, to print out instructions or further information for the student or administrators, such as test scores, etc.

Figure 10:
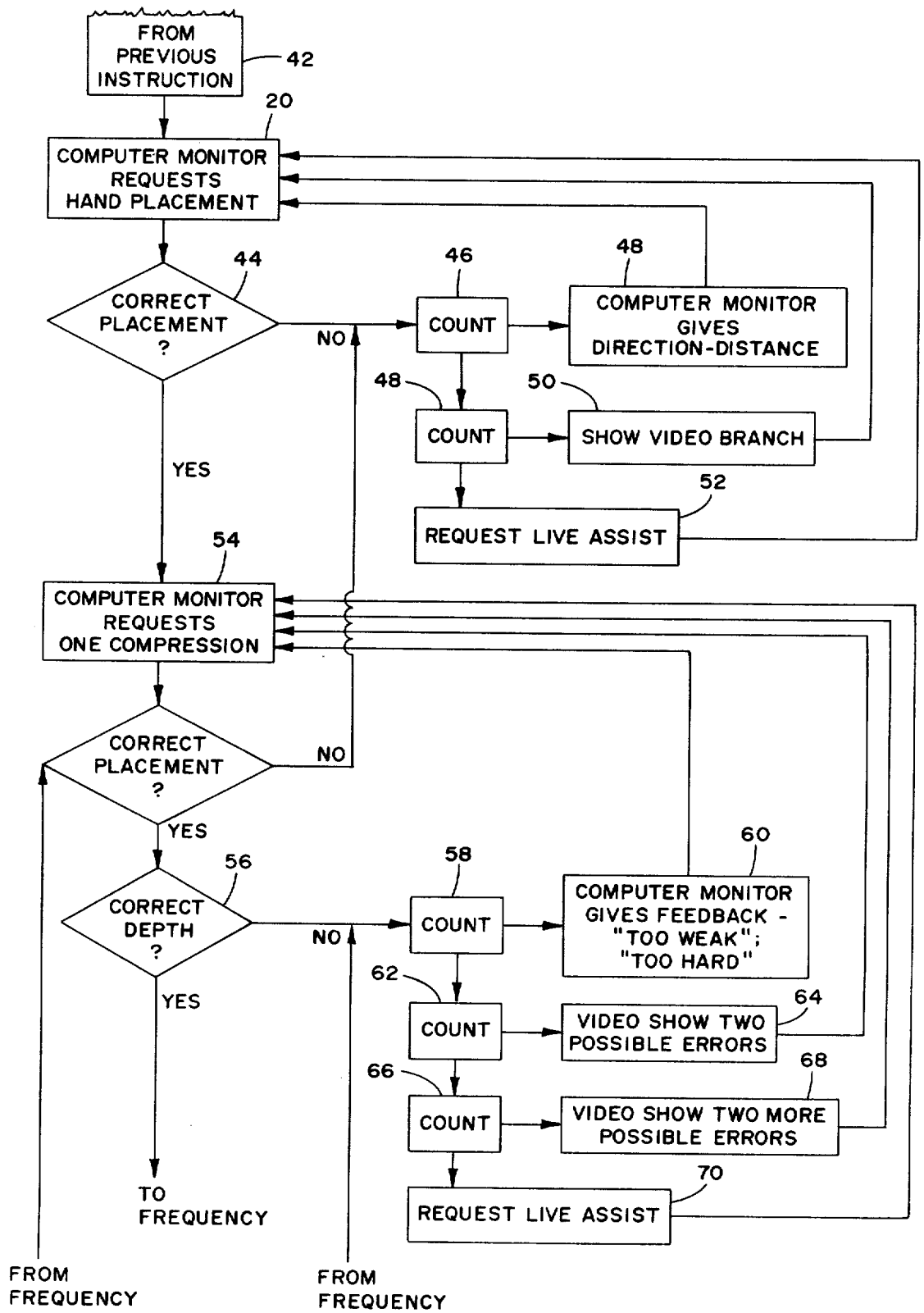
FIG. 10 is a program sample to control the system for cardiac compression.
Figure 10:
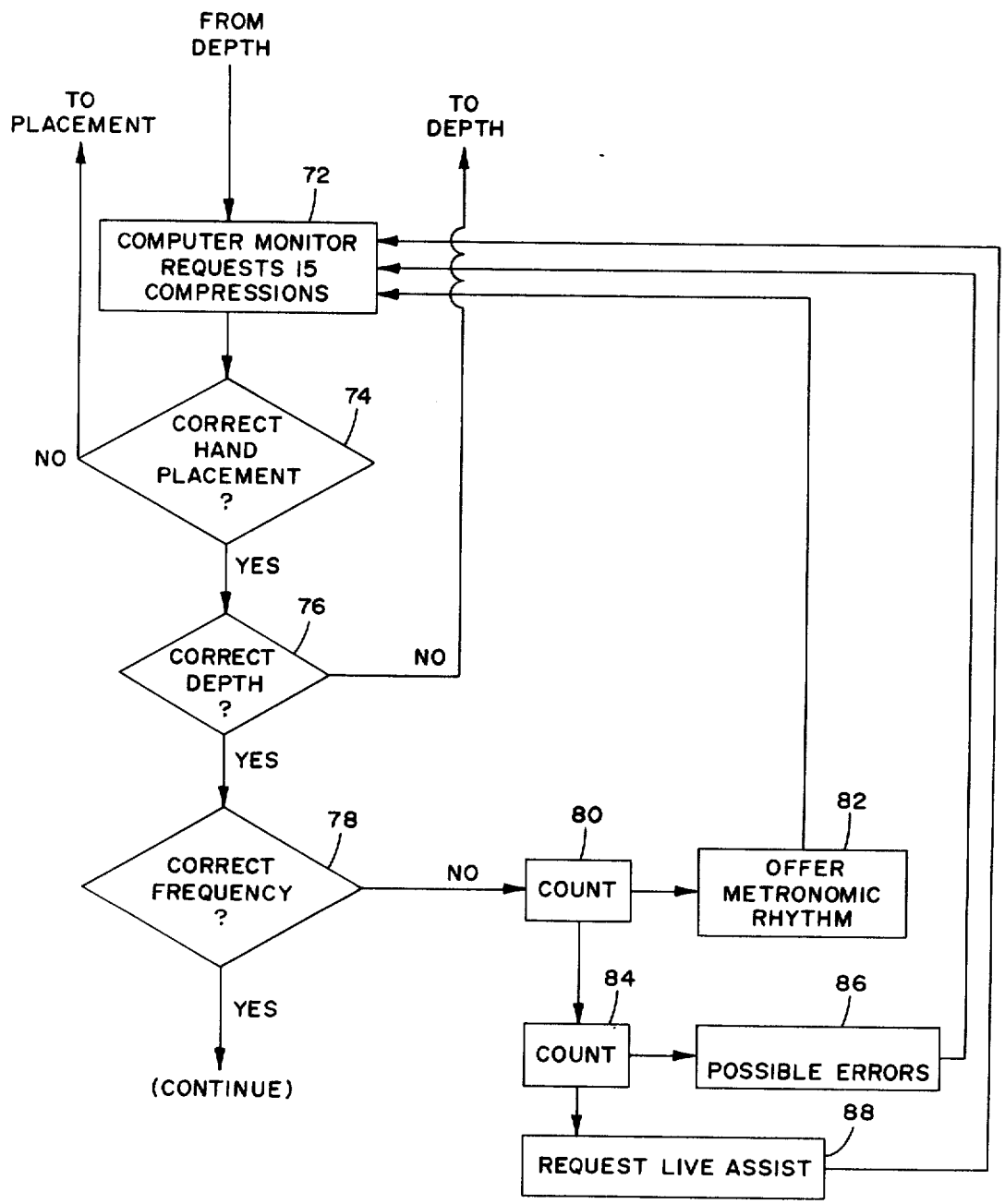

FIG. 10 illustrates the decision ladder for the cardiac compression function from which the appropriate program may be developed. From the previous instruction 42, the computer monitor 20 requests hand placement as illustrated previously in FIG. 7A. The computer then decides at 44 whether or not the hands are correctly placed. If not, the computer 14 counts the incorrect hand placement at 46 and the program at 48 instructs the computer monitor 20 to give the student the correct direction in which to move his hands and the distance which to move them. The computer monitor 20 then again requests the student to place his hands in the proper location. If the placement is again incorrect, the computer program at 48 again instructs the computer monitor 20 to give the student the correct direction and distance in which he should move his hands. When the student thus moves his hands, the computer 14 again checks the position of the hands at 44. If the hand position is again incorrect, the computer 14 may then call up the video branch through the second counter 49 which will randomly access video disc 22 and select the proper video branch 50 to illustrate to the student an actual demonstration of an individual placing the hands on another person in the correct position. The computer monitor 20 would then again request hand placement for the third time. It should be understood that the student can be taken through any one instruction branch or loop 48 and 50 as many times as necessary to exhaust the teaching capabilities of the system. If the hand position is incorrect again, then the computer, through the program, could instruct the student through a character presentation 52 to request live assistance.

When the hand position has finally been corrected, the computer monitor then presents a display as shown at 54 requesting the student to give one compression. Again, the computer checks for correct hand placement at 55, and if the hands are incorrectly placed, the student would be taken to the preceding stage where he would again go through the instruction on how to place the hands correctly as set forth earlier. If the hands are correctly placed, then the computer program checks for correct depth of compression at 56. If the depth of compression is improper, the attempt is counted at 58 and the computer monitor at 60 presents a character display indicating whether or not the compression has been too hard or too weak. The student is then again instructed to make one compression. Again, the correct placement of his hands is checked at 55 and the correct depth of the compression is checked at 56. If the compression is again incorrect, the counter at 62 selects the proper video channel 64 on video disc 22 to show possible errors that the student may be making and instructs him in how to correct the errors. Again, the computer requests a compression and again checks the hand placement at 55 and the depth of the compression at 56. Again, the counter at 66 selects a second video channel 68 to show more possible errors and how to correct them and then again instructs the student for a compression. Again, the hand position and depth is checked. If the depth is again incorrect, the counter selects the proper character display 70 which requests the student to seek live assistance.

If the hand placement is correct and the depth of compression is correct, then the computer monitor at 72 requests the student to make a particular number of compressions such as 15 of them. Again, the hand placement and depth of the compression is checked at 74 and 76 respectively. If the hand placement is incorrect, the program at 74 refers the student back to the pertinent preceding stage which gives the instruction on correct hand placement as set forth earlier. If the depth is incorrect, then the computer decides at 76 to refer the student back to the preceding stage described earlier which instructs the student in the procedures for obtaining correct depth of compression. If the hand placement and depth are correct, then the frequency is checked by the computer at 78. If the frequency is incorrect, it is noted by counter 80 and the program may cause an audible metronomic rhythm to be presented as shown at 82 to assist the student. If the frequency is still incorrect on the second attempt, counter 84 may signal the program to illustrate on the video screen or computer monitor by characters possible errors 86 and will instruct the student on how to avoid the errors. Again, after the instruction, the computer monitor at 72 will request the selected number of compressions. If the frequency is incorrect for a third time, the program will request live assistance at 88. If the frequency is correct, the program continues for the other functions to be taught to and performed by the student.

Figure 11:
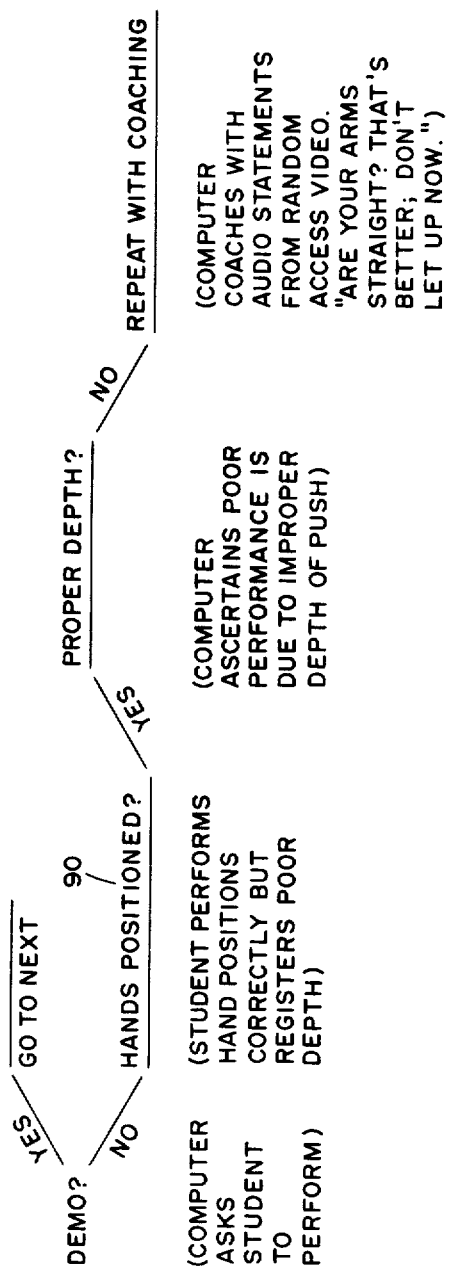
FIG. 11, FIG. 12 and FIG. 13 illustrate system decision trees for demonstrating pumping cycles and carotid pulse checking in the CPR educational system.
Figure 12:
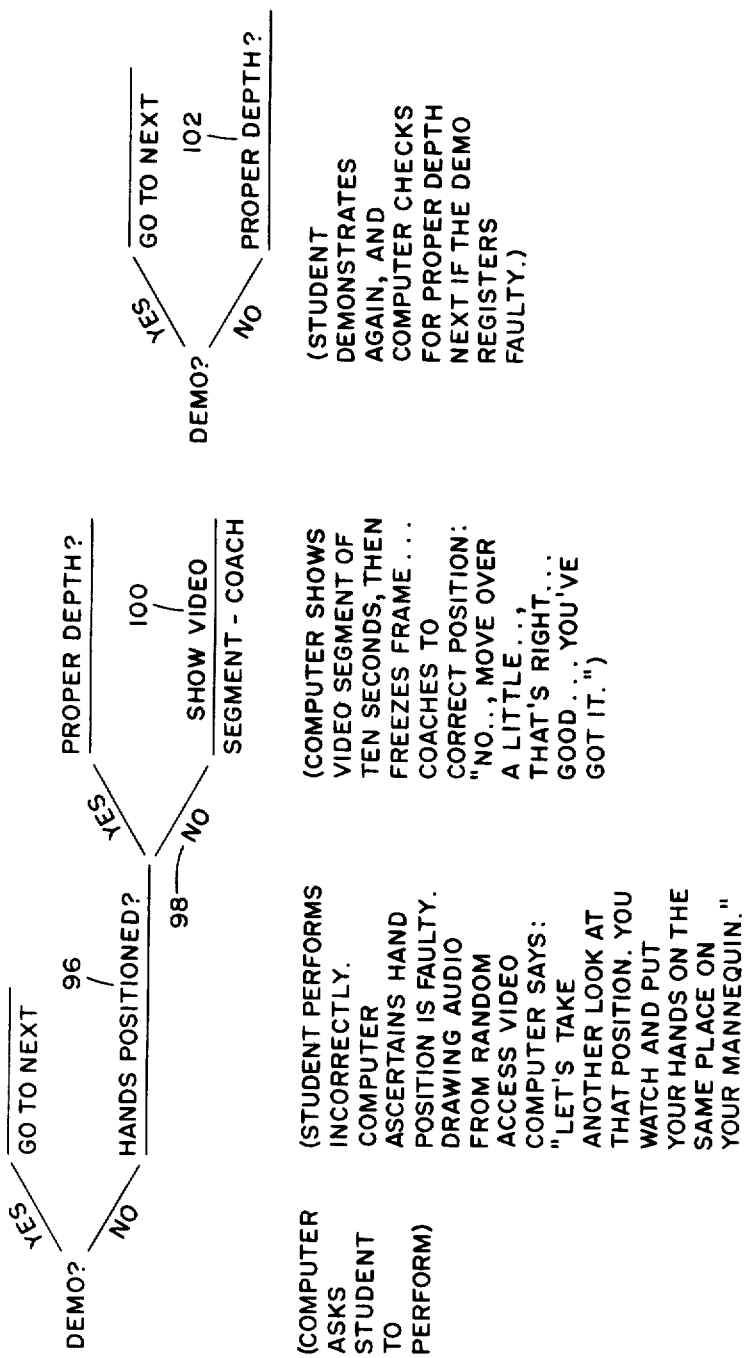
Figure 13:
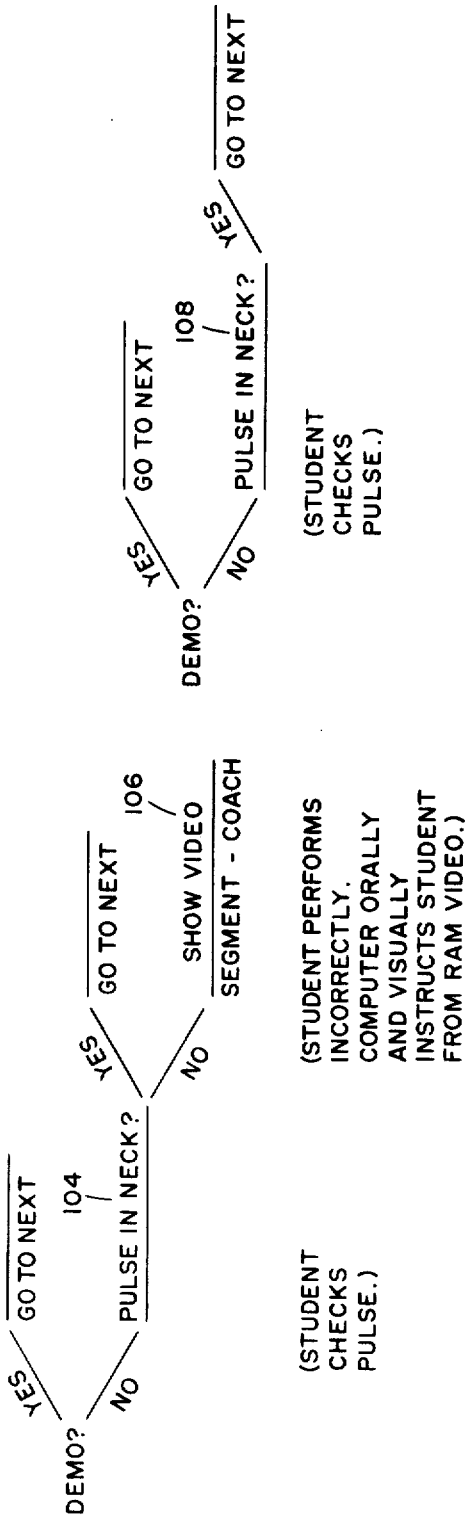

FIG. 11, FIG. 12 and FIG. 13 illustrate the importance of random access video in this system. In FIG. 11, a student is asked to demonstrate one pumping cycle. The computer first checks the hand position of the student at 90 and determines that the hands are correctly positioned. The computer then checks for proper depth and ascertains poor performance is due to improper depth of push. Since the depth was improper, the computer coaches the student with audio statements from the random access video, such as "Are your arms straight?" "That is better; do not let up now."

FIG. 12 illustrates a second student demonstrating one pumping cycle. The computer asks the student to perform and checks the hand position at 96. If the student performs incorrectly, the computer ascertains that the hand position is faulty and draws appropriate video and associated audio from the random access video disc which states "Let us take another look at that position. You watch and put your hands on the same place on the mannequin." If the hand position is still incorrect as at 98, the computer then selects a further video segment 100 to coach the student. The computer shows the video segment for approximately 10 seconds then freezes the frame and coaches the student orally, visually or both to correct the position of the hands. "No, move over a little. That is right. Good, you have got it." The student demonstrates again and if the hand position is correct, the computer checks for proper depth at 102 if the demonstration registers faulty.

FIG. 13 illustrates the student checking for the carotid pulse. At 104, the computer asks the student to check the pulse in the neck. If the demonstration is faulty, the computer selects a video presentation at 106 and orally and visually instructs the student on the random access video. Again, the computer asks the student to demonstrate and if the demonstration at 108 is correct, the computer then goes on to the next part of the instruction.

Figure 14:
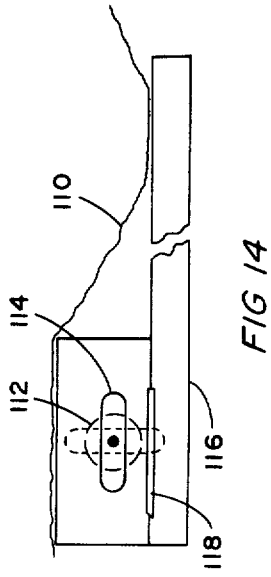
FIG. 14 is a diagrammatic representation of an electromechanical hydraulic pulse simulator.

FIG. 14 is a diagrammatic representation of an electromechanical hydraulic pulse simulator. This simulated pulse in the mannequin will be activated by a signal from the computer at the desired time. For instance, the signal could represent the carotid pulse. In that case, the device is placed under the skin 110 of the mannequin in the proper location at the neck. The sensor comprises a small motor 112 driving an eccentric wheel 114 which makes contact with a rubber tube 116 filled with hydraulic fluid and air. If the computer activates the electric motor to be driven at 40 revolutions per minute, eccentric wheel 114 will compress the side of rubber tube 116 creating a shock wave in the hydraulic fluid in rubber tube 116 which will result in a "pulse" of 80 beats per minute. This pulse rate can be varied with a digitally controlled motor and will be perceivable only when the device is activated by a signal from the computer. A nylon shield 118 may be placed between eccentric wheel 114 and rubber tube 116 to absorb wear caused by friction of eccentric wheel 114 turning against tube 116. Other piston/solenoid combinations would also be possible to achieve this pulse with the added advantage that with a solenoid the pulse rate could vary, as determined in the computer program.

Figure 15:
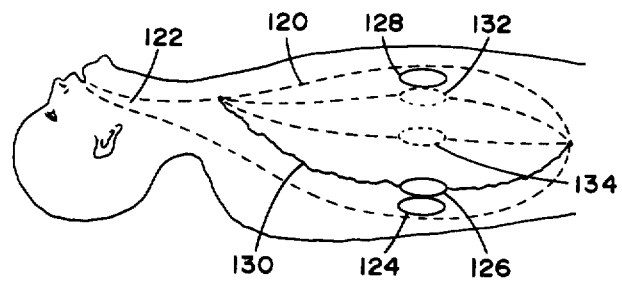
FIG. 15 is a diagrammatic representation of a lung fill sensor which allows the program to evaluate and respond to the student and to coach the student to proper lung fill techniques.

FIG. 15 illustrates the lung fill sensor which will relay three conditions to the computer, allowing the program to evaluate and respond to the student and to coach the student in proper lung fill techniques. The device consists of a flexible sac 120 within the mannequin and having an air passageway 122 connected to the mouth of the mannequin. Three contacts are involved. The first contact 124 rests on the bottom of the diaphragm 120. The second contact 126 is attached to a flexible membrane 130 which, with the bottom of the diaphragm 120 forms an air-tight seal. When air is forced into diaphragm 120 through airway 122, diaphragm 130 and switch 126 is forced upwardly toward contact 128. If sufficient air enters diaphragm 120, switch 126 will contact switch 128 as shown at 132 in dotted lines. If insufficient air enters diaphragm 120, switch 126 will remain in a position 134 shown in dotted lines which does not contact switch 128. Thus, when the lung is completely deflated, little or no air therein causes contacts 124 and 126 to make electrical contact. When the lung is partially but not satisfactorily inflated by the student, contact 126 separates from contact 124 and then returns to make contact with 124 without having contacted switch 128. When the lung is inflated satisfactorily, switch 126 separates from switch 124 and makes contact with switch 128 before recontacting switch 124. An expanding band or an air-pressure sensor would also be optional ways to achieve this effect.

Figure 16:
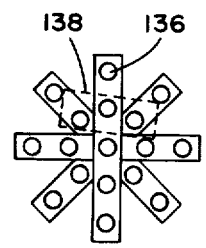
FIG. 16 is a diagrammatic representation of a hand position sensor which will allow the computer to evaluate normal errors in placement of the hands of the student prior to performing correct cardiac compression techniques.

FIG. 16 represents a hand position sensor which will allow the computer to evaluate normal errors in placement of the hands prior to correct cardiac compression. The array of sensors as shown in FIG. 16 will be placed just under or within the skin of the mannequin's chest at the proper location. For instance, it may be directly aligned above the depth of compression sensor as shown in U.S. Pat. No. 3,736,362. The array includes a plurality of heat or pressure sensitive contacts 136 which are arranged in straight lines separated by 45°. Each of the straight lines has five sensors for a total of 17 sensors since the middle sensor is common to the other lines. When the student is asked by the computer to place his hands on the chest for cardiac compression, the student stacks one hand on the other for this procedure. Assume that the student has placed his base hand incorrectly approximately two inches above the correct location and within the square 138 shown in FIG. 16. By the coding of the 45° arrangement in this array, the student can be "coached" by the computer. In this case, the computer would respond, "Move two inches down toward the stomach and you will be right on. There, that's it exactly." While heat or pressure sensitive contacts have been described, mylar sheets could also be used to set up electrostatic responses.

Figure 17:
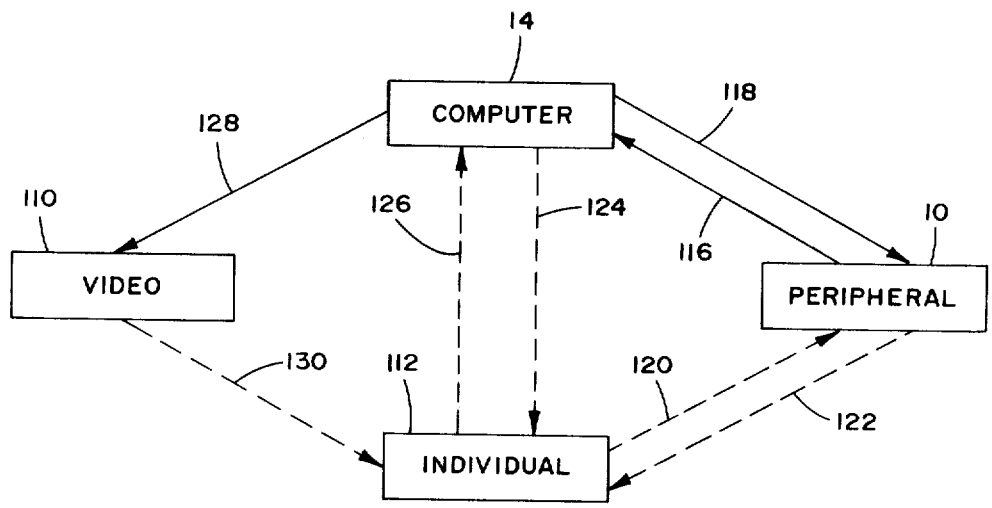

FIG. 17 illustrates diagrammatically how the interactive system functions in two loops, one being a simple instructional loop while the other is an interactive loop with the individual being instructed.

Peripheral device 10 produces signals on line 116 representing functions as performed by the individual. For instance, if the individual performs a cardiac compression, signals are generated on line 116 which indicate whether or not the function is performed correctly. In addition, the signals may indicate empirical data such as location of the hands with respect to a desired location. The computer 14 can then select from its memory, through a program, appropriate graphic and/or audio information which can instruct the individual via line 124, which represents video and audio, exactly where to move his hands, and the like.

The individual, then, may go to the peripheral 10 as represented by line 120 and attempt to correct the error in performing the function as instructed visually and orally by computer 14.

The computer 14 may also transmit signals to peripheral 10 via line 118 which create symptoms or indications which should be recognized by the individual. For instance, the computer 14 may send a signal on line 118 to peripheral 10 to activate a small motor such as illustrated in FIG. 14 to cause the appearance of a simulated carotid pulse. Through the video and audio represented by line 124, the computer may instruct the individual to check for the carotid pulse on the peripheral 10. The individual either finds or does not find the carotid pulse as represented by line 122 and conveys that information to computer 14 via a keyboard 16 or cursor 18 as shown in FIG. 2 and as represented by line 126 in FIG. 17.

At any time, the computer 14, through the program, may randomly access video storage disc 110 through line 128 to retrieve a picture or pictures of the actual performance of a desired function and display it via line 130 to individual 112 to reinforce a learning procedure or act.

Thus, as shown in FIG. 17, the novel computer controlled education system goes far beyond what is known in the art today wherein a computer may provide visual and audio instructions to an individual. In the present case, the individual is not only pretested and instructed but also performs the desired function, has that performance analyzed and corrected, is reinstructed as necessary by communicating with the system and is finally tested before completion of the instruction.

Thus, there has been disclosed a novel man machine interactive education system that not only shows and tells by conventional presentation methods and not only tests as in the interactive computer method, but also by means of computer graphics, pictorial video discs and simulation peripherals, it coaches the student. By utilizing two displays, either separate computer and video monitors, or mixed or split displays in one monitor, the system relates abstraction to reality in the learning process.

The basic life support instruction such as CPR illustrated in this case, is only one example of the numerous medical and other uses to which this computer/video/peripheral interactive educational system can be put to use. Other uses in the medical area might be computer-tutorial instruction in blood pressure screening and diagnosis in certain medical areas by pulse, temperature, or other sensors or reaction devices which could be built into a peripheral. However, peripherals need not always be input devices. For instance, peripherals might be made which exhibited certain body signs which the student would have to diagnose and respond with either peripheral input or conceptual input to the computer by means of keyboard or cursor if the computer monitor is involved. The unique feature of this disclosure is the system by which these devices may be used in a totally tutorial process.

Outside the medical area, there are many uses of simulation peripherals. For instance, one could easily learn to ride a motorcycle or drive an automobile mechanically by means of sensory peripherals and with the combination of video and computer monitors, a great deal more conceptual knowledge and simulated experience could be given prior to real life experience. In many cases, however, the self contained programs in this system would be sufficient to preclude the use of a live instructor at all. The person would be qualified in the area of instruction when the program of instruction was finished. All of this is possible in unlimited areas only touched on herein because the system provides a course of instruction which will show, tell, and coach toward three learning objectives of recognition, recall and performance in areas that require both conceptual and psychomotor skills.

Thus, while the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An interactive instruction system for teaching an individual comprising:
   (a) a peripheral having at least one sensor thereon for producing a signal representing a function which has been or is to be manually performed by said individual,
   (b) a first means for storing a sequence of signals representing instructions relating to the correct manner of performing said function,
   (c) a first video display coupled to said storing means for displaying said instructions,
   (d) a second means for storing video and associated audio signals representing both pictorial and oral representations of the correct manner of performing said function,
   (e) a second video display for displaying said pictorial representation, and
   (f) a computer coupled to said peripheral, said first and second storage means and said first and second displays for causing an ordered sequence of said instruction signals in said first signal storage means to be displayed by said first display whereby said individual may learn to recognize and to perform said function, for receiving said signals from said peripheral and detecting correct or incorrect performance of said function by said individual and for causing appropriate ones of said stored video signals to be displayed by said second display and said associated audio signals to be produced to illustrate the correct performance of said function if incorrectly performed by said individual whereby telling, showing and coaching of said individual in the recognition and performance of said function may be accomplished.

2. A system as in claim 1 wherein said peripheral includes a plurality of sensors each for producing said signal representing said function which has been or is to be manually performed.

3. A system as in claim 2 wherein said first means for storing a sequence of signals representing instructions relating to the correct performance of said function is a first memory.

4. A system as in claim 3 wherein said first memory stores signals representing written pretests for vocabulary and concepts relating to said function.

5. A system as in claim 4 wherein said first memory stores signals representing a plurality of concepts relating to said function which may be displayed whereby any one of said concepts may be selected for said pretest.

6. A system as in claim 5 further including a keyboard coupled to said computer to enable said student to communicate with said computer to cause selection and display of predetermined ones of said signals in said memory.

7. A system as in claim 6 further including a program coupled to said computer for causing said sequence of signals stored in said first memory to be displayed for testing, instructing, coaching, reviewing and final testing of all concepts relating to the correct performance of said function.

8. A system as in claim 7 wherein said program causes said audio and associated video signals stored in said second means to be presented on said second display in correlation with the display of said sequence of signals stored in said first memory whereby said first display may instruct graphically and in written communication and said second display may instruct pictorally and audibly.

9. A system as in claim 8 wherein said second means for storing video and audio signals is a second memory.

10. A system as in claim 9 wherein said second memory is a randomly accessed video disc coupled to said computer and said second display.

11. A system as in claim 10 further including a cursor coupled to said computer whereby intercommunication between said student and said computer may take place.

12. A system as in claim 11 wherein said program is hard wired into said first memory.

13. A system as in claim 12 wherein said first memory is an integral part of said computer.

14. A system as in claim 11 wherein said program is in a memory external to said computer.

15. A system as in claim 14 wherein said program is on a magnetic tape cassette.

16. A system as in claim 15 wherein said peripheral is a mannequin representing at least a part of a human body.

17. A system as in claim 16 wherein said sensors produce signals relating to the cardiopulmonary resuscitation function.

18. A system as in claim 17 wherein said sensors produce signals relating to hand placement, depth of push, frequency of push, lung filling and pulse location.

19. A system as in claim 18 wherein said sensors produce said signals in response to physical performance of functions required to complete cardiopulmonary resuscitation.

20. A system as in claim 19 whereby said testing, instructing, coaching, reviewing, and final testing relate to cardiopulmonary resuscitation.

21. A system as in claim 20 wherein said stored video signals include pictures of actual performance of cardiopulmonary resuscitation functions.

22. A system as in claim 21 where said first and second displays are individual video screens.

23. A system as in claim 20 wherein said first and second displays are individual sections of one video screen.

24. A method of computerized instruction and testing of an individual in performing a predetermined function comprising the steps of:
  (a) storing a sequence of signals representing instructions relating to the correct performance of said function,
  (b) storing video and associated audio signals relating to the correct performance of said function,
  (c) displaying on first and second video displays said instructions and video signals in conjunction with said audio signals under the control of a computer,
  (d) manually performing said function on a peripheral according to said instructions,
  (e) detecting any incorrect performance of said function, and
  (f) displaying appropriate ones of said instructions and video signals in conjunction with said audio signals under the control of said computer to illustrate the correct manner of performing said function that was incorrectly performed whereby the need for an actual instructor and live instruction is eliminated.

25. A method as in claim 24 wherein said step of detecting incorrect performance of said function includes the step of actuating at least one of a plurality of sensors during said performance whereby signals are produced representing correct or incorrect performance of said function.

26. A method as in claim 25 wherein said sequence of signals representing instructions are stored in a first memory and said video and associated audio signals are stored in a second randomly accessed memory.

27. A method as in claim 26 wherein the step of storing instructions which may be displayed includes storing signals representing a pretest for vocabulary and concepts relating to said function.

28. A method as in claim 27 wherein storage of said pretest signals includes storing a plurality of concepts relating to said function whereby any one of said display concepts may be selected for said pretest.

29. A method as in claim 28 including the step of selecting predetermined ones of said storage signals through a keyboard to said computer or through a cursor in conjunction with one of said displays whereby intercommunication with said computer occurs.

30. A method as in claim 29 including the step of programming said computer to cause said sequence of said signals to be displayed for testing, instructing, coaching, reviewing and final testing of all concepts relating to the correct performance of said function.

31. A method as in claim 30 including the step of programming said audio and video signals to be displayed in correlation with said sequence of signals whereby said first display may provide graphic instructions concerning correct concepts of performing said function and said second display may provide such instruction pictorially and audibly.

32. A method as in claim 31 including the step of storing said video and audio signals on a video disc coupled to said computer and said second display.

33. A method as in claim 32 including the step of hard wiring said program into said first memory.

34. A method as in claim 33 including the step of forming said first memory as an integral part of said computer.

35. A method as in claim 32 including the step of forming said first memory external to said computer.

36. A method as in claim 35 including the step of forming said program on a magnetic tape cassette.

37. A method as in claim 36 including the step of forming said peripheral as a mannequin representing at least a part of a human body.

38. A method as in claim 37 including the step of performing cardiopulmonary resuscitation as said function.

39. A method as in claim 38 including the step of placing sensors on said mannequin to produce signals representing physical performance of each of the plurality of functions necessary to complete cardiopulmonary resuscitation.

40. A method as in claim 39 wherein said sensors produce signals relating to hand placement, depth of push, frequency of push, lung filling and pulse location.

41. A method as in claim 40 whereby said testing, instructing, coaching, reviewing and final testing relate to the cardiopulmonary resuscitation function.

42. A method as in claim 41 wherein the step of storing video signals includes the storing of signals representing pictures of actual performance of cardiopulmonary resuscitation functions.

43. A method as in claim 42 including the step of utilizing an individual video screen for said first and second displays.

44. A method as in claim 42 including the step of utilizing a single video screen with separate areas for said first and second displays.

45. A computer controlled interactive education system for teaching an individual comprising:
   (a) a peripheral device for producing signals representing functions as performed by said individual and producing symptoms representing functions to be recognized by said individual,
   (b) a computer coupled to said peripheral device for receiving said signals from said peripheral representing functions performed by said individual and transmitting signals to said peripheral to produce said symptoms to be recognized by said individual, said computer analyzing said signals received from said peripheral and generating displayable graphic information and audible instructions to said individual based on said analysis whereby said individual performs functions with said peripheral as directed by said displayed and audible instructions from said computer,
   (c) means electronically coupled to said computer enabling said individual to communicate with said computer in response to said displayed graphic and audible instructions, and
   (d) means coupled to said computer for generating and displaying selected video information regarding actual performance of said functions to be performed by said individual with accompanying audio sound whereby said individual may be visually and audibly instructed by said graphics and an actual demonstration of the desired performance and recognition of said functions, may actually perform the desired functions as instructed by said system and cause signals to be transmitted to said computer representing actual or simulated performance of said desired functions, may have said signals which represent the functions performed by said individual analyzed and may receive further corrective instructions from said computer until said functions performed by said individual are correct.

46. A system as in claim 45 wherein said electronic means coupled to said computer to enable said student to communicate with said computer comprises:
   (a) a first display,
   (b) a keyboard for entry of alphanumeric information in response to said displayed graphic or audible information, and
   (c) a cursor for entry of information in accordance with oral instructions or visual instructions on said first display.

47. A system as in claim 46 wherein said means for generating video information with accompanying audio sound is a randomly accessed video disc.

* * * * *